US012718180B2

(12) United States Patent
Centeno et al.

(10) Patent No.: US 12,718,180 B2
(45) Date of Patent: Aug. 25, 2026

(54) COMPUTERIZED SYSTEMS AND METHODS FOR ELECTRONIC DOCUMENT PREPARATION

(71) Applicant: Federal Express Corporation, Memphis, TN (US)

(72) Inventors: Roglly Thais Centeno, Winter Garden, FL (US); Bland Honors, Memphis, TN (US); Michael Smith, Irving, TX (US); Vijay Jagannathan, Flower Mound, TX (US); Ryan Zielke, Fort Worth, TX (US)

(73) Assignee: Federal Express Corporation, Memphis, TN (US)

( * ) Notice: Subject to any disclaimer, the term of this patent is extended or adjusted under 35 U.S.C. 154(b) by 211 days.

(21) Appl. No.: 17/364,979

(22) Filed: Jul. 1, 2021

(65) Prior Publication Data

US 2023/0004924 A1 Jan. 5, 2023

(51) Int. Cl.
*G06Q 10/083* (2024.01)

(52) U.S. Cl.
CPC .................................. *G06Q 10/083* (2013.01)

(58) Field of Classification Search
CPC .... G06Q 10/083; G06Q 10/10; G06F 40/174; G06F 16/93; G06N 20/00
See application file for complete search history.

(56) References Cited

U.S. PATENT DOCUMENTS 10,824,982 B1 * 11/2020 Whitehouse ....... G06Q 10/0832
2013/0006821 A1 * 1/2013 Pirrello ................ G06Q 10/083 705/331
2017/0098264 A1 * 4/2017 Priebatsch .............. H04L 67/52
2018/0211214 A1 * 7/2018 Gadaev .................. G06Q 10/08
2019/0019129 A1 * 1/2019 McDaniel ............. G06F 16/958
2019/0073348 A1 * 3/2019 Cheesman ........... G06V 30/412
2020/0184386 A1 * 6/2020 Hooghwerff ......... G06Q 10/063
2021/0084028 A1 * 3/2021 Izvekova .............. H04L 67/306
2021/0173854 A1 * 6/2021 Wilshinsky ............. G06F 9/451
2021/0304134 A1 * 9/2021 Noyes .................... G06N 20/00
2022/0383255 A1 * 12/2022 Trevalyan .......... G06Q 10/0875

OTHER PUBLICATIONS

Johansen, "Automatic completion of customs documents," Shipmondo, Apr. 15, 2021, Retrieved from https://web.archive.org/web/20210415052428/https://help.shipmondo.com/en/articles/4556867-automatic-completion-of-customs-documents (Year: 2021).*

* cited by examiner

*Primary Examiner* — Bryan J Kirk
(74) *Attorney, Agent, or Firm* — Finnegan, Henderson, Farabow, Garrett & Dunner, LLP

(57) ABSTRACT

Embodiments of the present disclosure include computer-implemented systems and methods for generating an electronic shipping document. The systems may include a memory storing instructions configured to be executed by a processor to perform operations. The operations may include causing a display of a user device to present a user interface. The user interface may include an inquiry relating to an item to be shipped. The operations may also include receiving, via the user interface, a response to the inquiry and analyzing the response to identify one or more electronic documents for shipping the item. The operations may further include causing the user interface to present the one or more electronic documents, and populating one or more fields of the one or more electronic documents based on the response to the inquiry.

16 Claims, 14 Drawing Sheets

Figure 3:
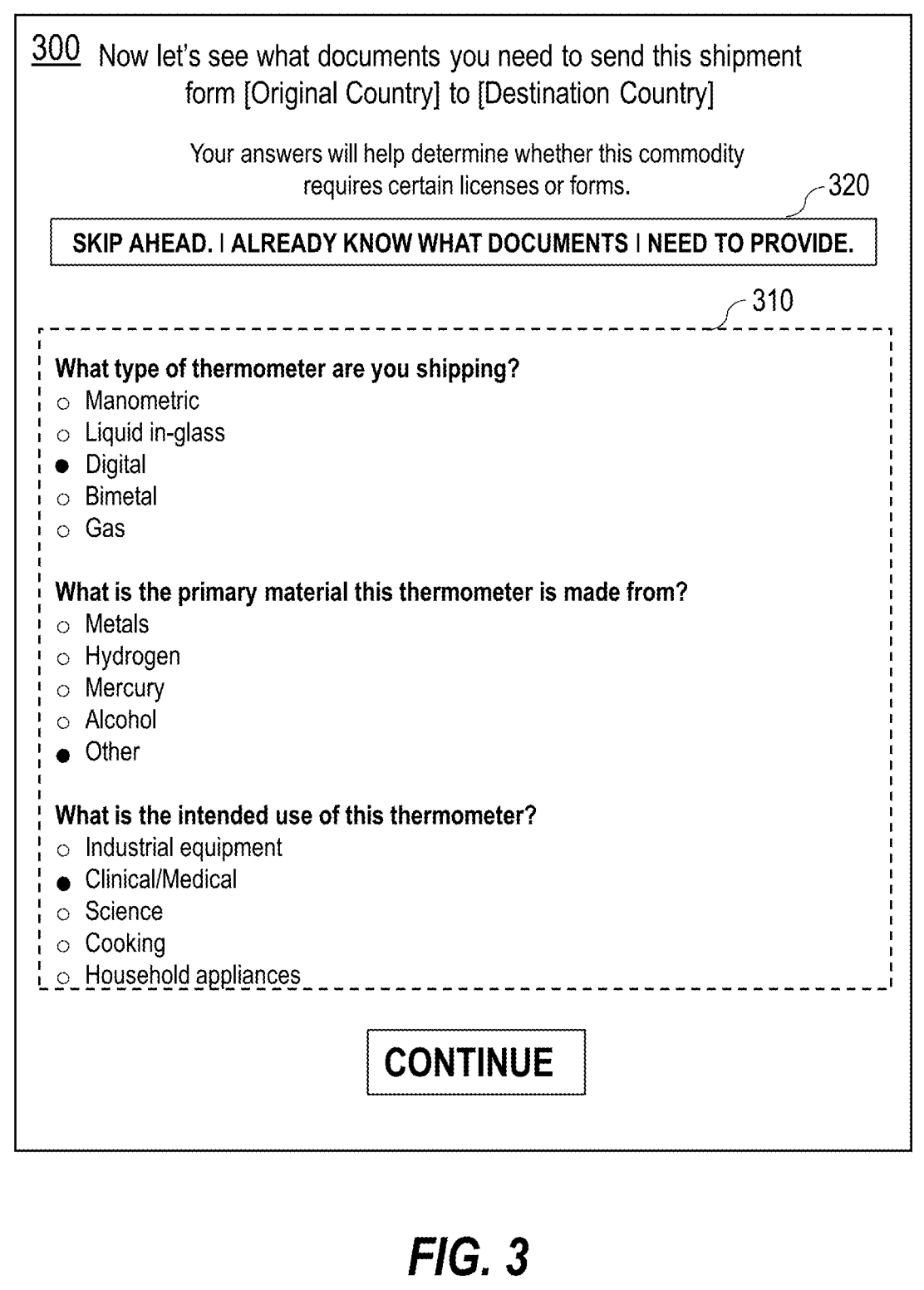

300 Now let's see what documents you need to send this shipment form [Original Country] to [Destination Country]

Your answers will help determine whether this commodity requires certain licenses or forms.

320

SKIP AHEAD. I ALREADY KNOW WHAT DOCUMENTS I NEED TO PROVIDE.

310

What type of thermometer are you shipping?
- ○ Manometric
- ○ Liquid in-glass
- ● Digital
- ○ Bimetal
- ○ Gas

What is the primary material this thermometer is made from?
- ○ Metals
- ○ Hydrogen
- ○ Mercury
- ○ Alcohol
- ● Other

What is the intended use of this thermometer?
- ○ Industrial equipment
- ● Clinical/Medical
- ○ Science
- ○ Cooking
- ○ Household appliances

Figure 4B:
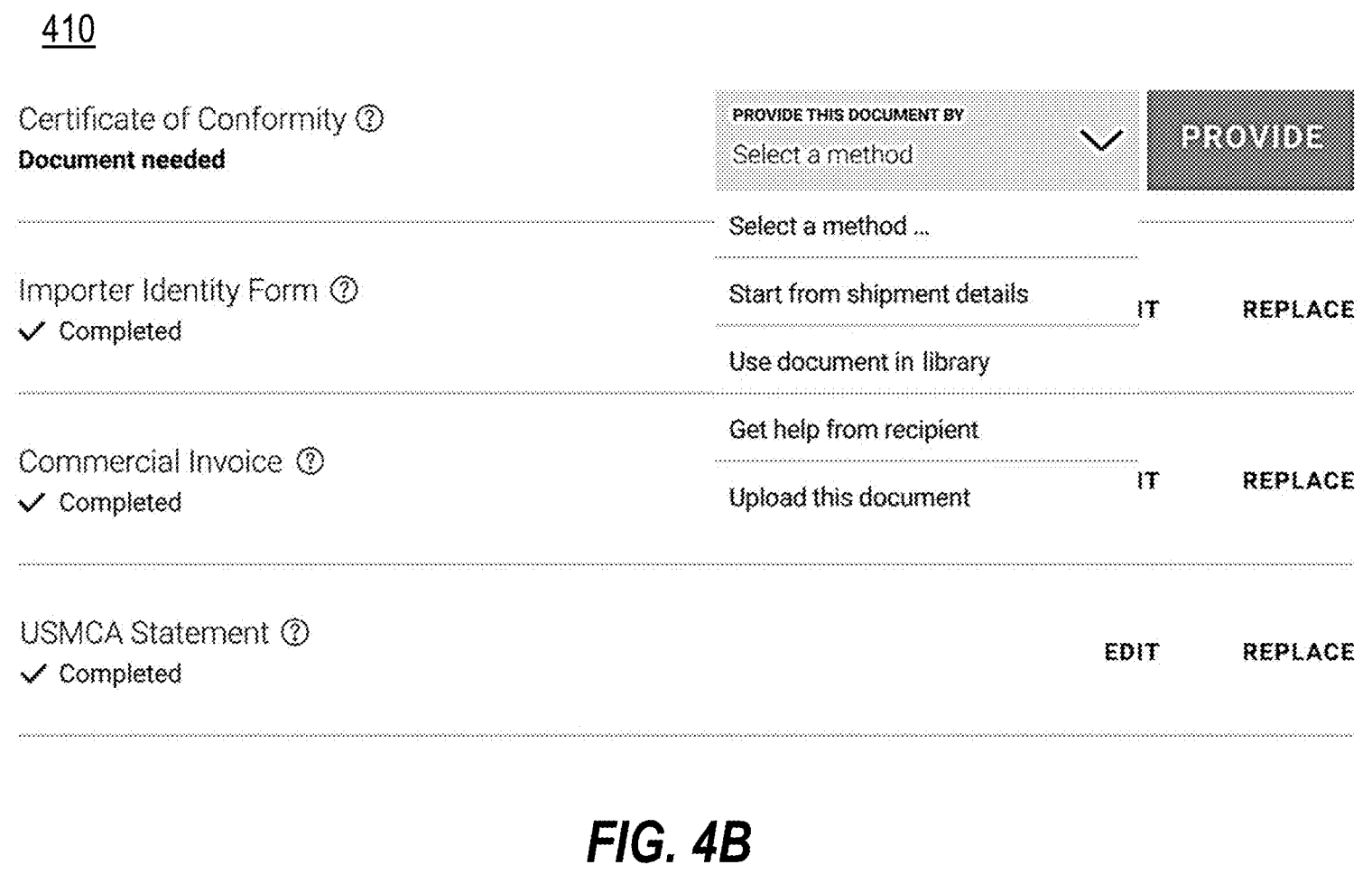

Certificate of Conformity ⓘ
Document needed

PROVIDE THIS DOCUMENT BY
Select a method
PROVIDE

Select a method ...
Start from shipment details
Use document in library
Get help from recipient
Upload this document Importer Identity Form ⓘ
✓ Completed
IT REPLACE Commercial Invoice ⓘ
✓ Completed
IT REPLACE USMCA Statement ⓘ
✓ Completed
EDIT REPLACE

| ALL DOCUMENTS 50 | FILTERS | Search | | | |
|---|---|---|---|---|---|

| | DOCUMENT NAME | TYPE | COUNTRY | SOURCE | COMMODITY |
|---|---|---|---|---|---|
| ☐ | Import Certificates | Folder | | | |
| ☐ | Export Licenses | Folder | | | |
| ☐ | Shipment 22423451234 | Folder | | | |
| ☐ | Shipment 31243451234 | Folder | | | |
| ☐ | Shipment 90234451234 | Folder | | | |
| ☐ | 2018_Certificate_Conformity | Document | Country | JPG | Commodity |
| ☐ | 2020_Certificate_Conformity | Document | Country | FedEx Generated | Commodity |
| ☐ | QX0 Template Document | Document | Country | PDF | Commodity |
| ☐ | 7W2 Template Document | Document | Country | PDF | Commodity |
| ☐ | FF4 Template Document | Document | Country | FedEx Generated | Commodity |

PROVIDE ANOTHER WAY

USE SELECTED

Figure 4D:
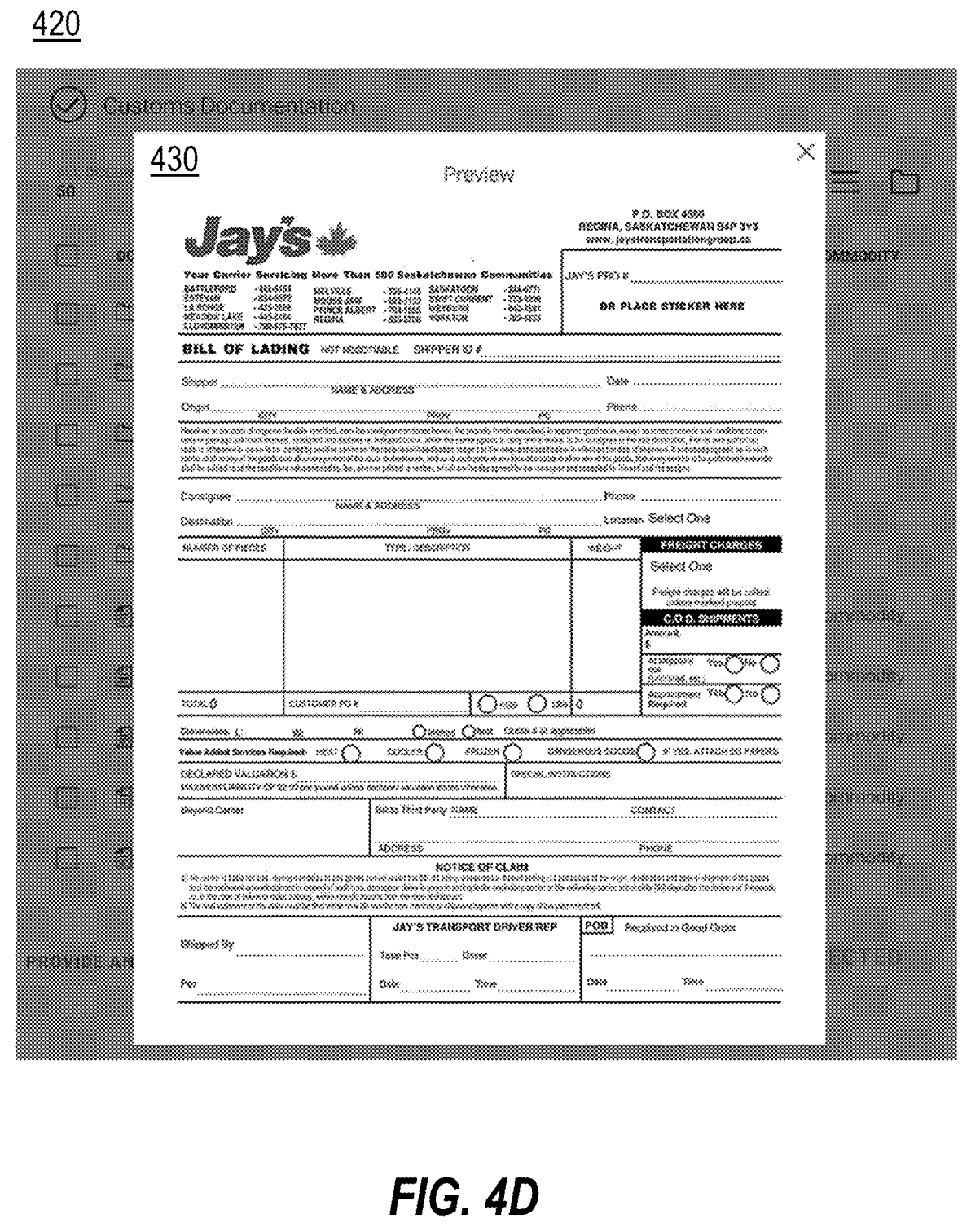

Customs Documentation

430

Preview

Jay's

Your Carrier Servicing More Than 500 Saskatchewan Communities

P.O. BOX 4580
REGINA, SASKATCHEWAN S4P 3Y3
www.jaystransportationgroup.ca

JAY'S PRO #

OR PLACE STICKER HERE

BILL OF LADING NOT NEGOTIABLE SHIPPER ID #

Shipper NAME & ADDRESS Date

Origin CITY PROV PC Phone

Consignee NAME & ADDRESS Phone

Destination CITY PROV PC Location Select One

NUMBER OF PIECES | TYPE / DESCRIPTION | WEIGHT

FREIGHT CHARGES

Select One

C.O.D. SHIPMENTS

Amount $

TOTAL 0 CUSTOMER PO # 0

Value Added Services Required HEAT COOLER FROZEN DANGEROUS GOODS IF YES, ATTACH DG PAPERS

DECLARED VALUATION $

SPECIAL INSTRUCTIONS

Beyond Carrier

Bill to Third Party NAME CONTACT

ADDRESS PHONE

NOTICE OF CLAIM

JAY'S TRANSPORT DRIVER/REP

POD Received in Good Order

Shipped By

Per

Total Pcs Driver

Date Time

Date Time

| ALL DOCUMENTS 50 | FILTERS | Search | | | |
|---|---|---|---|---|---|

| ☐ | DOCUMENT NAME | TYPE | COUNTRY | SOURCE | COMMODITY |
|---|---|---|---|---|---|
| ☐ | Import Certificates | Folder | | | |
| ☐ | Export Licenses | Folder | | | |
| ☐ | Shipment 22423451234 | Folder | | | |
| ☐ | Shipment 31243451234 | Folder | | | |
| ☐ | Shipment 90234451234 | Folder | | | |
| ☑ | 2018_Certificate_Conformity | Document | Country | JPG | Commodity |
| ☐ | 2020_Certificate_Conformity | Document | Country | FedEx Generated | Commodity |
| ☐ | QX0 Template Document | Document | Country | PDF | Commodity |
| ☐ | 7W2 Template Document | Document | Country | PDF | Commodity |
| ☐ | FF4 Template Document | Document | Country | FedEx Generated | Commodity |

PROVIDE ANOTHER WAY

USE SELECTED

USMCA BLANKET PERIOD START DATE
2021/06/18
USMCA BLANKET PERIOD END DATE
2022/06/18
SELECTION INPUT FIELD
Option A selected
EXAMPLE REQUIRED FIELD (FLAGGED)
Field flagged for completion
SHORT REQUIRED FIELD
SELECTION FIELD
Select an option

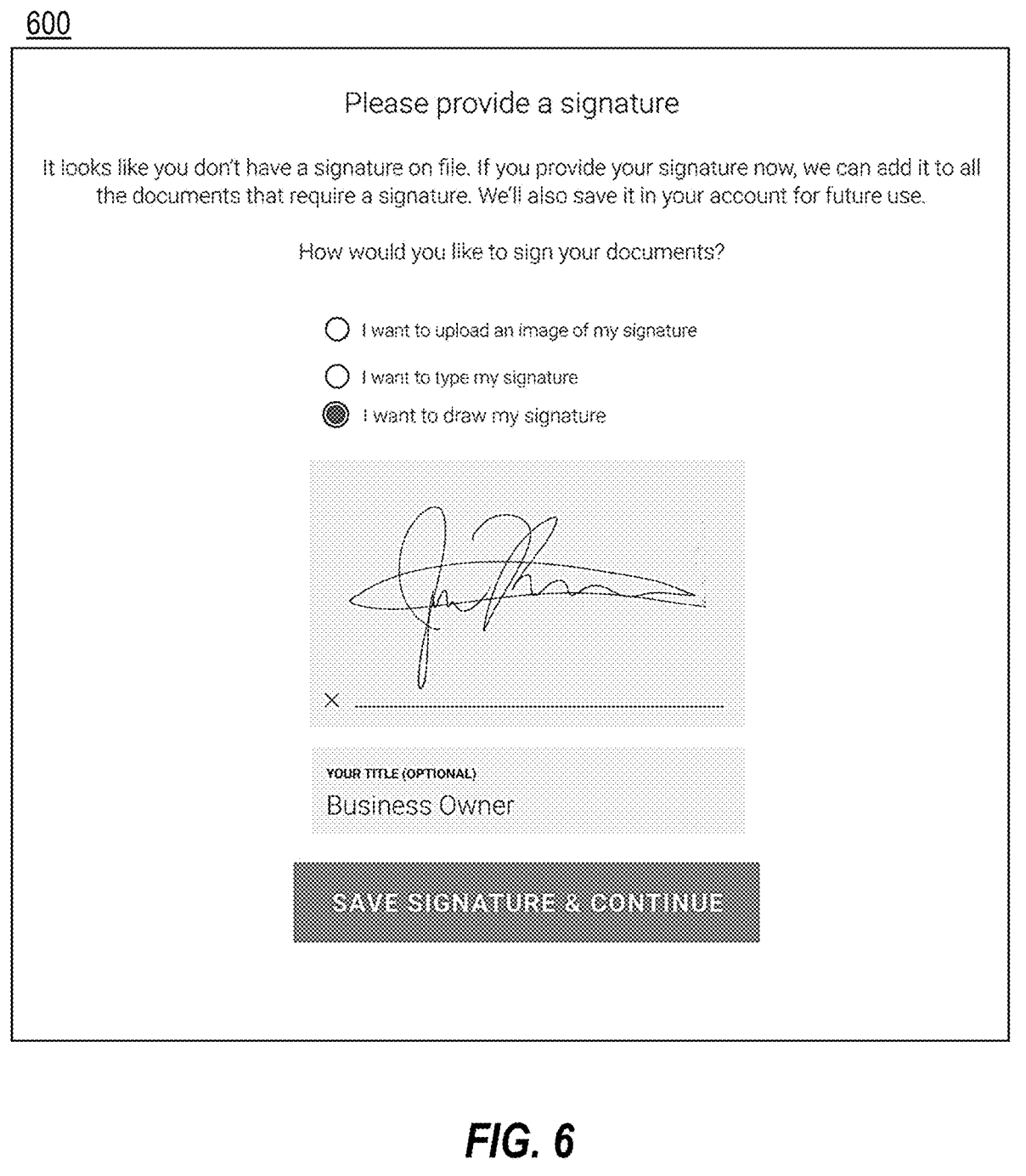

Please provide a signature

It looks like you don't have a signature on file. If you provide your signature now, we can add it to all the documents that require a signature. We'll also save it in your account for future use.

How would you like to sign your documents?

- I want to upload an image of my signature
- I want to type my signature
- I want to draw my signature

X

YOUR TITLE (OPTIONAL)

Business Owner

SAVE SIGNATURE & CONTINUE

FIG. 6

COMPUTERIZED SYSTEMS AND METHODS FOR ELECTRONIC DOCUMENT PREPARATION

TECHNICAL FIELD

The present disclosure generally relates to computerized systems and methods for electronic document preparation. In particular, embodiments of the present disclosure relate to inventive and unconventional systems and methods for identifying and preparing various electronic documents required for shipping products domestically and internationally.

BACKGROUND

With the advancement and widespread acceptance of e-commerce, Internet shopping offers a one-stop shop for all shopping needs including food, furniture, electronics, clothes, books, etc. Due to accessibility and ease of internet shopping, large volumes of products are purchased and sold. However, the increased shopping volume is associated with the need to ship large volumes of purchased items to locations across the globe.

Shipping requirements for items vary depending on multiple factors. For example, some requirements may vary based on the type of product or commodity, weight, size, shape, monetary value, location or jurisdiction from which the product or commodity ships, the location or jurisdiction where the item is made or assembled, and/or the location or jurisdiction which the item travels to or passes through. Various jurisdictions have different requirements including documents or forms, or type of packaging needed to ensure shipment.

What is needed is a system that automates or aids in the generation of documents, forms, or communications that are required to ensure shipment of a product or commodity from one location to another. Such a system would enable a user unfamiliar with all aspects of shipping a product to successfully navigate domestic and/or international shipping of products.

Therefore, there is a need for improved methods and systems for the preparation of international shipping documents.

SUMMARY

One aspect of the present disclosure is directed to a computer-implemented system for generating one or more electronic shipping documents. The system may include a memory comprising instructions. The system may include at least one processor configured to execute the instructions to perform operations including causing a display of a user device to present a user interface. The user interface may include an inquiry relating to an item to be shipped. The operations may also include receiving, via the user interface, a response to the inquiry and analyzing the response to identify one or more electronic documents for shipping the item. The operations may further include causing the user interface to present the one or more electronic documents, and populating one or more fields of the one or more electronic documents based on the response to the inquiry.

Another aspect of the present disclosure is directed to a computer-implemented method for generating one or more electronic shipping documents. The method include causing a display of a user device to present a user interface. The user interface may include an inquiry relating to an item to be shipped. The method may also include receiving, via the user interface, a response to the inquiry and analyzing the response to identify one or more electronic documents for shipping the item. The method may further include causing the user interface to present the one or more electronic documents, and populating one or more fields of the one or more electronic documents based on the response to the inquiry.

Another aspect of the present disclosure is directed to a computer-implemented system for generating one or more electronic shipping documents. The system may include a memory comprising instructions. The system may include at least one processor configured to execute the instructions to perform operations including causing a display of a user device to present a user interface. The user interface may include an inquiry relating to an item to be shipped. The operations may also include receiving, via the user interface, a response to the inquiry, and analyzing the response to identify one or more electronic documents for shipping the item. The operations may further include populating one or more first fields of the one or more electronic documents based on the response to the inquiry. The operations may also include determining that information to be filled in the one or more electronic documents, and generating an electronic message requesting the information. The operations may further include transmitting, via a network, the electronic message to a third-party, and receiving, from the third-party, a response comprising the requested information. The operations may also include populating, based on the requested information, one or more second fields of the one or more electronic documents. The operations may further include causing the user interface to present the one or more electronic documents with the populated one or more first fields and the populated one or more second fields.

Other systems, methods, and computer-readable media are also discussed herein.

BRIEF DESCRIPTION OF THE DRAWINGS

FIG. 3 shows a schematic representation of an exemplary graphical user interface, consistent with embodiments of the present disclosure.

FIGS. 4A-4F are schematic representations of exemplary graphical user interfaces, consistent with embodiments of the present disclosure.

FIGS. 5A-5E are schematic representations of additional exemplary graphical user interfaces, consistent with embodiments of the present disclosure.

FIG. 6 is a schematic representation of another exemplary graphical user interface, consistent with embodiments of the present disclosure.

DETAILED DESCRIPTION

Figure 1:
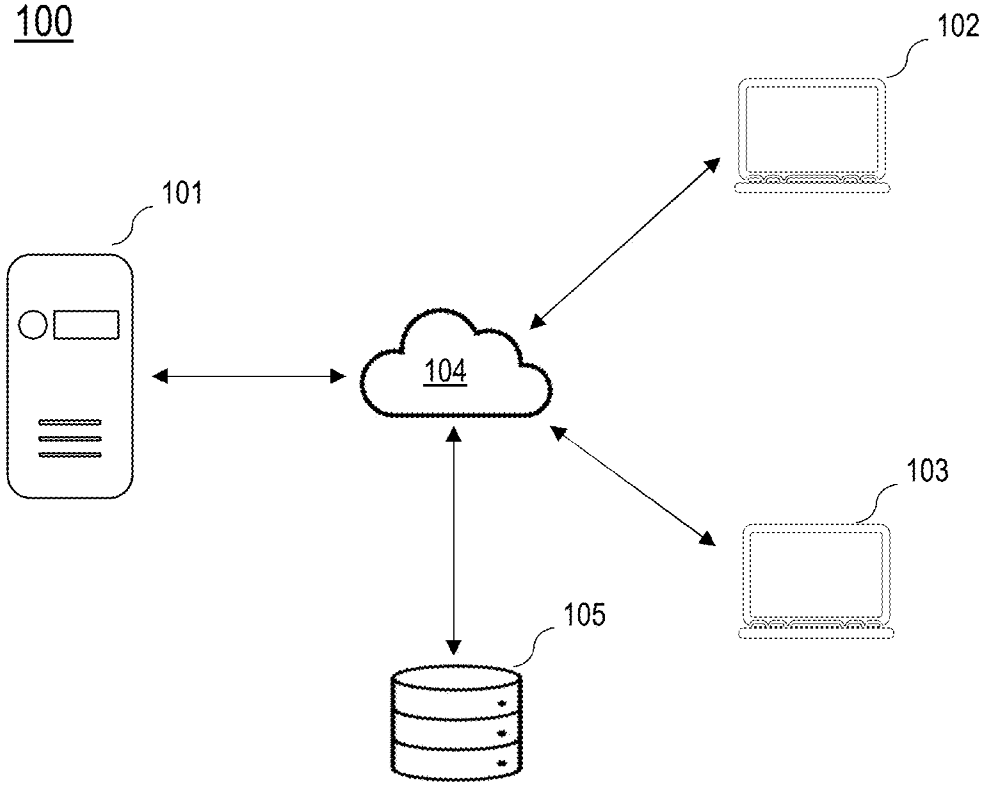
FIG. 1 is a schematic representation of an exemplary system for generating an electronic document, consistent with embodiments of the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

The present disclosure provides systems and methods for generating one or more electronic shipping documents. In one embodiment, a system may be configured to provide a user device with a user interface, presenting an inquiry relating to an item to be shipped by a user associated with the user device. For example, the system may provide the user interface to the user device via a webpage or an application. The system may also be configured to receive a response to the inquiry from the user via the user interface. By way of example, the user may enter information responding to the inquiry via the user interface. Alternatively or additionally, in response to the inquiry, the user may scan a barcode on the package of the item using a scanner associated with the user device, which may be configured to recognize the barcode and obtain information (e.g., the product type) related to the item based on the recognized barcode. The user device may also be configured to transmit the obtained information to the system. The system may further be configured to identify one or more electronic documents to be generated and/or filled based on the received response (and other information if needed). For example, the inquiry may include a question related to a product type of the item to be shipped. The system may be configured to determine that the product type specified in the received response may be subject to one or more restriction rules by, for example, the recipient country. The system may also be configured to identify a specific customs form for the received product type and obtain the identified customs form from an electronic document database. The system may further be configured to populate one or more fields of the customs form and present the customs form with the populated field(s) to the user via the user interface. In some embodiments, the system may be configured to print out the one or more electronic documents upon a confirmation from the user.

FIG. 1 is a schematic illustration of an exemplary system 100 for generating one or more electronic documents, consistent with embodiments of the present disclosure. As illustrated in FIG. 1, system 100 may include a server 101, a user device 102, a third-party device 103, a network 104, and a database 105. Although only one of server 101, user device 102, third-party device 103, network 104, and database 105 are illustrated in FIG. 1, it is contemplated that system 100 may include any number of these components.

In some embodiments, server 101 may be a standalone desktop or other computer. Server 101 may be implemented as a server, a server system comprising a plurality of servers, or a server farm comprising a load balancing system and a plurality of servers. Server 101 may be configured to provide a user interface to a user via, for example, user device 102 for generating one or more electronic documents. The user interface may include one or more inquiries related to shipping of a product. Server 101 may be configured to receive a response from the user and populate one or more fields of an electronic document based on the received response.

User device 102 may include computational devices such as personal computers, laptop computers, desktop computers, tablet computers, notebooks, mobile phones, smart watches, other smart devices, etc. User device 101 may be configured to execute an application or a set of instructions to send or receive data and/or instructions to and/or from server 101, third-party device 103, database 105, etc. User device 102 may be configured to interact with other components of system 100. For example, user device 102 may be configured to present a user interface to the user and receive input from the user. User device 102 may also be configured to communicate information and data with server 101 and/or third-party device 103. For example, user device 102 may transmit to server 101 information related to the user's response to one or more inquiries relating to a shipping order.

Like user device 102, third-party device 103 may include computational devices such as personal computers, laptop computers, desktop computers, tablet computers, notebooks, mobile phones, smart watches, other smart devices, etc. Third-party device 103 may be configured to execute an application or a set of instructions to send or receive data and/or instructions to and/or from server 101, user device 102, database 105, etc. Third-party device 103 may be configured to communicate with other components of system 100. For example, third-party device 103 may be configured to receive a message for requesting information relating to a shipping order from server 101 and/or user device 102. Third-party device 103 may also be configured to transmit the requested information to server 101 and/or user device 102 based on a response by the third-party.

Network 104 may be configured to facilitate communications among the components of system 100. Network 104 may be a public network or private network and may include, for example, a wired or wireless network, including, without limitation, a Local Area Network (LAN), a Wide Area Network (WAN), a Metropolitan Area Network, an IEEE 802.11 wireless network (e.g., "Wi-Fi"), a network of networks (e.g., the Internet), a land-line telephone network, or the like. Network 104 may be connected to other networks (not depicted in FIG. 1) to connect the various system components to each other and/or to external systems or devices. In some embodiments, network 104 may be a secure network and require a password to access the network.

Database 105 may store information and data for the components of system 100 (e.g., server 101, user device 102, and/or third-party device 103). In some embodiments, server 101, user device 102, and/or third-party device 103 may be configured to access database 105, and obtain data stored from and/or upload data to database 105 via network 104. In some embodiments, database 105 may be configured to store one or more electronic documents, consistent with disclosed embodiments. Database 105 may include a cloud-based database (e.g., Amazon Relational Database Service (RDS)) or an on-premises database. In some embodiments, database 105 may be an XML database, an RDBMS database, an SQL database or NoSQL alternatives for data storage/search such as, for example, MongoDB, Redis, Couchbase, Datastax Enterprise Graph, Elastic Search, Splunk, SoIr, Cassandra, Amazon DynamoDB, Scylla, HBase, and Neo4J. Database 105 may be a component of the disclosed system 100 or a remote computing component (e.g., a cloud-based data structure). Database 105 may include view configuration data, expression data, datasets, model data (e.g., model parameters, training criteria, performance metrics, etc.), and/or other data, consistent with disclosed embodiments.

Figure 2:
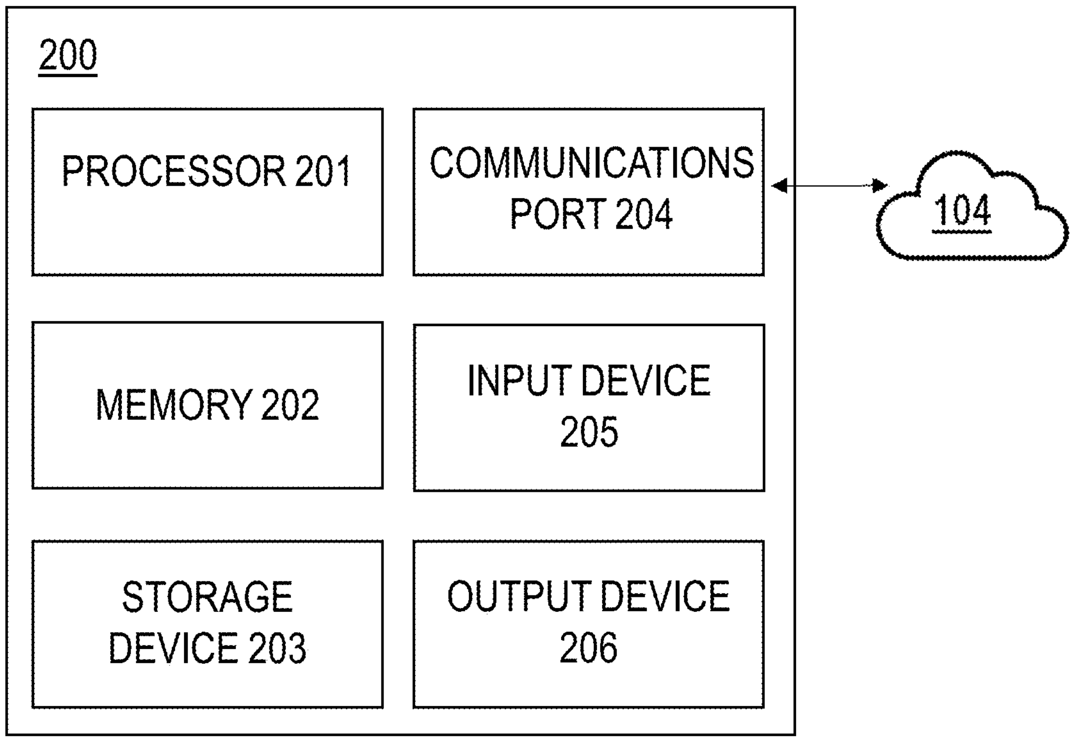
FIG. 2 is a block diagram of an exemplary computing device, consistent with embodiments of the present disclosure.

FIG. 2 is a block diagram of an exemplary computing device 200, consistent with some embodiments of the present disclosure. One or more of server 101, user device 102, and/or third-party device 103 may be implemented based on the architecture of computing device 200. For example, server 101 may include one or more components of computing device 200 configured to perform its functions disclosed in this application; user device 102 may include one or more components of computing device 200 configured to perform its functions disclosed in this application; and/or third-party device 103 may include one or more components of computing device 200 configured to perform its functions disclosed in this application.

As illustrated in FIG. 2, computing device 200 may include at least one processor (e.g., processor 201), a memory 202, at least one storage device (e.g., storage device 203), a communications port 204, an input device 205, and an output device 206.

Processor 201 may be configured to perform one or more functions of server 101, user device 102, and/or third-party device 103 described in this disclosure. Processor 201 may include a microprocessor, preprocessors (such as an image preprocessor), a graphics processing unit (GPU), a central processing unit (CPU), support circuits, digital signal processors, integrated circuits, memory, or any other types of devices suitable for running applications or performing a computing task. In some embodiments, processor 201 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.). Any of the processing devices disclosed herein may be configured to perform certain functions. Configuring a processing device, such as any of the described processors or other controller or microprocessor, to perform certain functions may include programming of computer-executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

Computing device 200 may also include a memory 202 that may store instructions for various components of computing device 200. For example, memory 202 may store instructions that, when executed by processor 201, may be configured to cause processor 201 to perform one or more functions described herein. Memory 202 may include any number of random-access memories, read-only memories, flash memories, disk drives, optical storage, tape storage, removable storage, and other types of storage. In one instance, memory 202 may be separate from processor 201. In another instance, memory 202 may be integrated into processor 201. In some embodiments, memory 202 may include software for performing one or more computing tasks, as well as a trained system, such as a neural network, or a deep neural network, for example.

Storage device 203 may be configured to store various data and information for one or more components of computing device 200. For example, processor 201 may obtain one or more electronic documents stored in storage device 203, and write (and/or update) one or more electronic documents in storage device 203. Storage device 203 may include one or more hard drives, tapes, one or more solid-state drives, any device suitable for writing and read data, or the like, or a combination thereof.

Communications port 204 may be configured to facilitate data communications between computing device 200 and one or more components of system 100 via network 104. For example, server 101 may include communications port 204 configured to transmit an inquiry to be represented in the user interface of user device 102 via network 104. Communications port 204 may include a modem, a network interface (e.g., an Ethernet card or a wireless network card), a PCMCIA slot and card, a cellular network card, etc. Communications port 204 may be configured to communicate via wire, cable, fiber optics, radio frequency ("RF") linkWI-FI, BLUETOOTH, nearfield, LI-FI, and/or any other wireless transmission method.

Input device 205 may be configured to receive input from the user of computing device 200, and one or more components of computing device 200 may perform one or more functions in response to the input received. In some embodiments, input device 205 may include an interface displayed on a touchscreen (e.g., output device 206). Input device 205 may additionally or alternatively include one or more of a physical keyboard, a haptic feedback device, a touchpad, a mouse, a microphone, virtual touch screen keyboard, a joystick, a stylus, a button, a switch, a dial, a knob, and/or any other I/O device. Output device 206 may be configured to output information and/or data to the user. For example, output device 206 may include a display configured to display a user interface for completing one or more electronic documents. As another example, output device 206 may include a printer configured to print one or more documents (e.g., a shipping label, a custom form, a clearance form, etc.). Additionally or alternatively, output device 206 may include, for example, a display (e.g., an LED display, VR display), a headset, augmented glasses (e.g., GOGGLE GLASS), etc.

In some embodiments, server 101 may provide a user interface to user device 102. For example, server 101 may provide a webpage accessible by user device 102 via network 104. The webpage may include a user interface that may be presented in a display associated with user device 102. For example, FIG. 3 shows a schematic representation of an exemplary graphical user interface 300 that may be presented on a display associated with user device 102. As illustrated FIG. 3, graphical user interface 300 may include one or more questions (e.g., request for input) relating to an item to be shipped. For example, graphical user interface 300 may include three questions in area 310 relating to a thermometer to be shipped (e.g., "What type of thermometer are you shipping?", "What is the primary material this thermometer is made from?", "What is the intended use of this thermometer?"). It should be understood that the graphical user interface 300 is exemplary and many other types of graphical user interfaces with other requests for input may be presented to the user.

In some embodiments, the user may know the electronic document(s) to be completed and click button 320 in graphical user interface 300 to skip the inquiry. Server 101 (and/or user device 102) may provide a list of electronic documents from which the user may select the one or more documents required to ship the product. In some embodiments, server 101 (and/or user device 102) may populate one or more fields of an electronic document selected by the user via the user interface, as described elsewhere in this disclosure.

In some embodiments, the inquiry presented in the user interface may include one or more of: a question related to the item (e.g., a product size, a product weight, a product material, a product grade, etc.), a question related to the sender (e.g., the identity of the sender, the shipping address, the shipping zip code, the contact information, etc.), a question related to the recipient (e.g., the destination address, the destination country, the identity of the recipient, the contact information, etc.), and a question relating to the shipping payment (e.g., the identity of the paying party (e.g., the sender or the recipient being responsible for the shipping payment), the payment method, etc.).

In some embodiments, server 101 (and/or user device 102) may present one or more inquiries related to the shipping. For example, graphical user interface 300 may display a first inquiry "Are you shipping one of the products listed below?" and present a list of products including a thermometer. Server 101 (and/or user device 102) may receive a user selection of "thermometer" via graphical user interface 300. Server 101 (and/or user device 102) may also determine a second inquiry as a follow-up inquiry and present the second inquiry to the user in graphical user interface 300 (e.g., an inquiry "What type of thermometer are you shipping?").

In some embodiments, the user may enter information in response to the questions via an input device (e.g., input device 205) associated with user device 102 via graphical user interface 300. The information may be received by server 101 (and/or user device 102), which may be configured to identify one or more electronic documents to be completed for shipping a product (e.g., the thermometer) based on the information received from user device 102. By way of example, as illustrated in FIG. 3, server 101 (and/or user device 102) may be configured to receive the response (e.g., "Digital," "Other," "Clinical/Medical") from the user via graphical user interface 300. Server 101 (and/or user device 102) may analyze the received response to identify one or more electronic documents for shipping the item. For example, server 101 (and/or user device 102) may employ a rule-based model for identifying one or more electronic documents based on the received response. A rule-based model may be used to identify one or more electronic documents by applying a set of rules to the received response. By way of example, a simplied rule-base model for identifying one or more electronic documents may include the following {IF:THEN} expression: {IF 'Digital' AND 'Other' AND 'Clinical/Medical' THEN 'DocA' AND 'DocB'}. When server 101 inputs the received response including a combination of "Digital," "Other," "Clinical/Medical" (in response to the three sample questions discussed above) into the rule-based model, the rule-based model may output indication of two electronic documents, namely, "DocA" and "DocB" based on the {IF:THEN} expression.

In some embodiments, server 101 (and/or user device 102) may identify one or more electronic documents based on the received response using a machine-learning algorithm or neural network for identifying one or more electronic documents for shipping the item. For example, server 101 may include a machine-learning algorithm or neural network that is trained using training samples (e.g., positive and/or negative training samples) generated based on history shipping orders. By way of example, a positive training sample may be generated based on document information (e.g., the document(s) included for the shipping order) extracted from a shipping order with proper documents (which means that the shipping order is free of documentation issues), while a negative training sample may be generated based on document information (e.g., the document(s) included for the shipping order) extracted from a shipping order with improper documents (which means that the shipping order has at least one documentation issue). Server 101 may input the response received from the user (and other types of information if needed) into the machine learning algorithm and/or neural network, which may generate an output indicating one or more electronic documents for shipping the item. In some embodiments, one or more training samples may be generated by server 101 (or by a different computing device). In some embodiments, the machine learning algorithm or neural network may be trained by server 101. Alternatively, the machine learning algorithm may be trained by a different computing device.

Figure 4A:
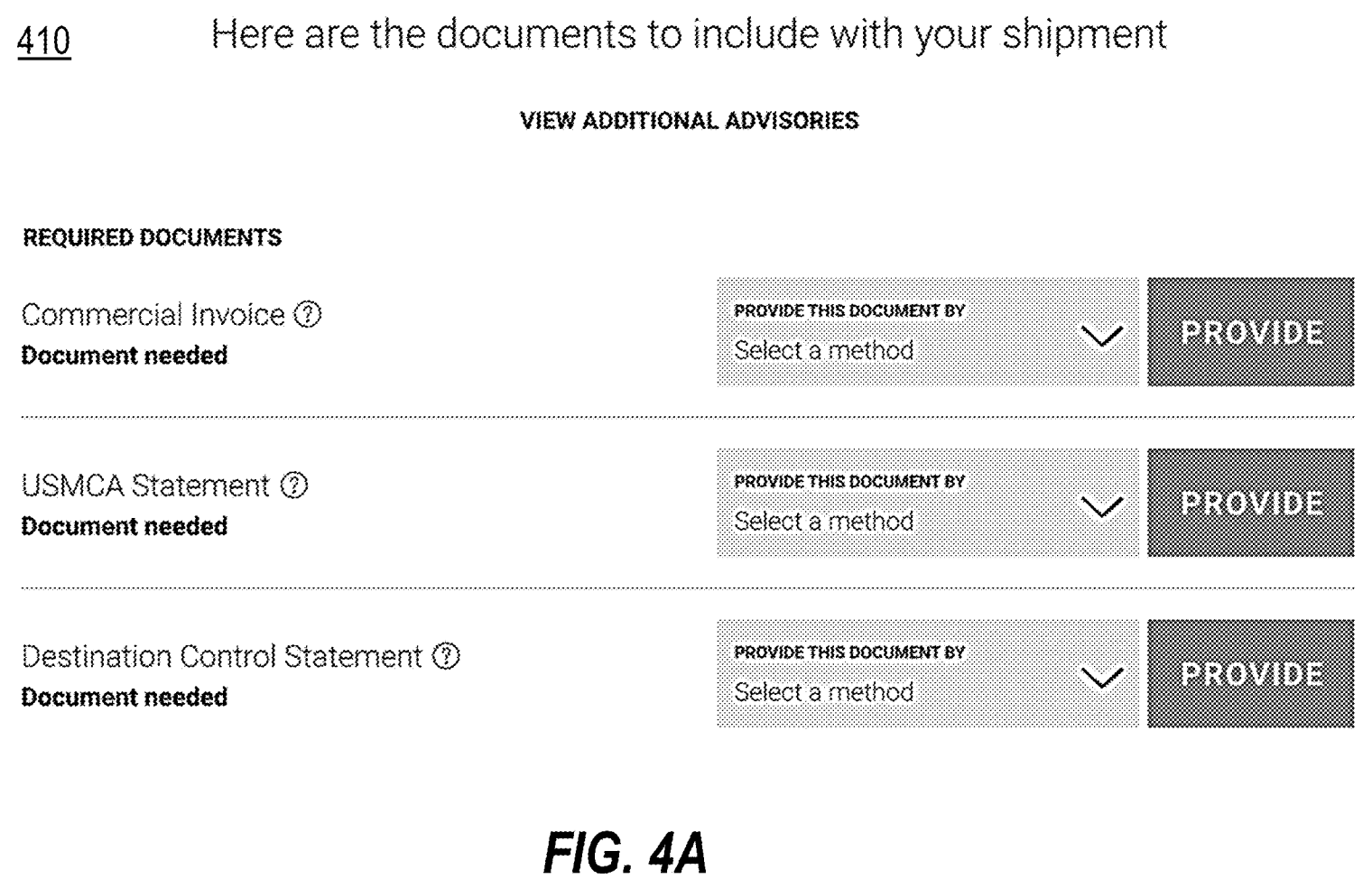

In some embodiments, server 101 (and/or user device 102) may obtain one or more identified electronic documents (e.g., a blank electronic document) from a local storage device (e.g., storage device 203) and/or database 105 via network 104. Alternatively or additionally, server 101 (and/or user device 102) may request one or more identified electronic documents from the user and/or a third-party. A third-party may include the recipient, a government agent, a vendor, a party related to the shipment (e.g., the manufacturer of the product included in the package), or the like, or a combination thereof. By way of example, FIG. 4A is a schematic representation of an exemplary graphical user interface 410. As illustrated in FIG. 4A, server 101 (and/or user device 102) may present graphical user interface 410 listing three electronic documents to be provided in connection with the shipping of the item, including, for example, a commercial invoice, a United States-Mexico-Canada Agreement (USMCA) statement, and a destination control statement.

In some embodiments, server 101 (and/or user device 102) may present various options for the user to provide one or more identified documents. For example, server 101 (and/or user device 102) may present a few options in graphical user interface 410 for the user to provide a certificate of conformity, as illustrated in FIG. 4B. By way of example, graphical user interface 410 may present a first option to fill in the information needed to complete the certificate of conformity by starting from shipping details, a second option of using a document stored in a document library (which may be stored in a local storage associated with user device 102 and/or server 101, or a remote database such as database 105), a third option for requesting the document from a third-party (e.g., the recipient of the package), and a fourth option of uploading the document. The user may select one of the options to complete the document via graphical user interface 410.

Figure 4F:
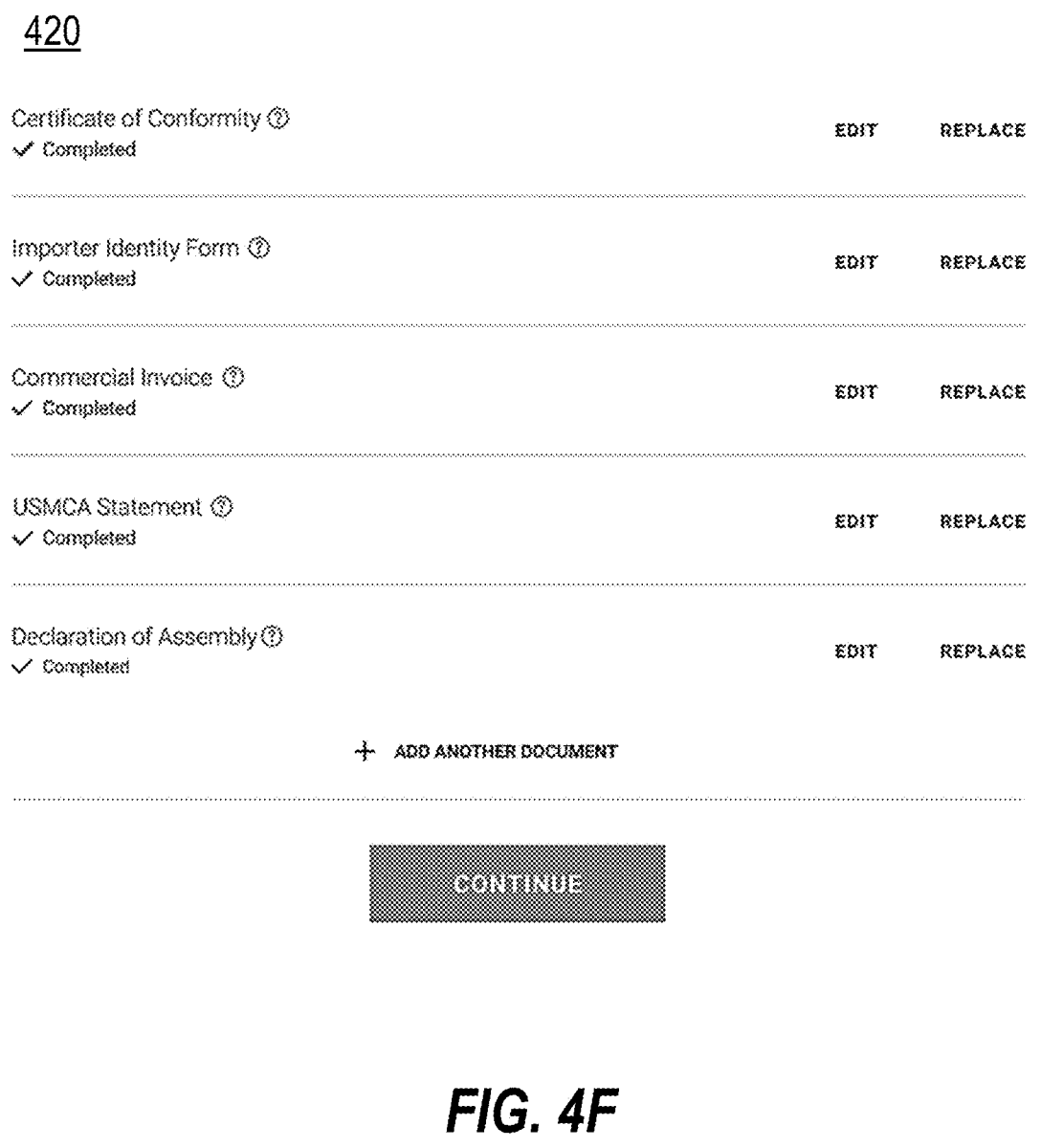

For example, the user may select the second option of using a document stored in a document library via graphical user interface 420, which may lead server 101 (and/or user device 102) to present a user interface including one or more documents stored in a document library. For example, server 101 (and/or user device 102) may present an exemplary graphical user interface 420 illustrated in FIG. 4C for the user to browse and/or operate one or more electronic documents. As illustrated in FIG. 4C, graphical user interface 420 may include information relating to one or more electronic documents, such as the document name, the document type, the country involved in the document, the source of the document, the date of the document, etc. The user may click one of the documents via graphical user interface 420 to view additional information of the document. By way of example, the user may select one of the documents, namely, 2018_Certificate_Conformity via graphical user interface 420. As illustrated in FIG. 4D, server 101 (and/or user device 102) may also be configured to present an overlaid window 430 showing at least a portion of the selected document. The user may also select the document via graphical user interface 420 (as illustrated in FIG. 4E) as the certificate of conformity for the present shipping order. Server 101 (and/or user device 102) may further be configured to check the certificate of conformity and present an indication in graphical user interface 420 that the document is completed, as illustrated in FIG. 4F. In some embodiments, graphical user interface 420 may enable the user to modify, update, and/or replace one or more documents.

In some embodiments, server 101 (and/or user device 102) may be configured to determine whether an electronic document is completed. For example, server 101 (and/or user device 102) may determine whether all required fields of the electronic document are completed and/or correct. If server 101 (and/or user device 102) determines that the electronic document is completed, server 101 (and/or user device 102) may store the electronic document in a local storage device (e.g., storage device 203) and/or database 105.

In some embodiments, server 101 (and/or user device 102) may extract information from one or more saved electronic documents (e.g., one or more completed electronic documents) and save the information in a data structure different from the electronic document. In some embodiments, the information extracted from electronic documents may be aggregated into one data structure, which may be stored in association with a user profile for future use (e.g., for populating one or more fields of an electronic document for another shipping order).

In some embodiments, server 101 (and/or user device 102) may populate one or more fields based on the response to the inquiry and/or other information. For example, as described elsewhere in this disclosure, referring to FIG. 3, graphical user interface 300 may present one or more questions relating to the item to be shipped. Server 101 (and/or user device 102) may receive the response to the one or more questions via graphical user interface 300 (e.g., “Digital,” “Other,” “Clinical/Medical” illustrated in FIG. 3).

Server 101 (and/or user device 102) may also obtain an electronic document (e.g., a document template of a certificate of conformity) and populate one or more fields of the electronic document relating to the type of the thermometer, the primary material of the thermometer, and/or the intended use of the thermometer (e.g., filling “digital,” “other,” “clinical/medical” into the relevant fields of the electronic document). Alternatively or additionally, server 101 (and/or user device 102) may obtain other information relating to the sender, the recipient, and/or the item and populate one or more fields of an electronic document based on the obtained information. For example, server 101 (and/or user device 102) may obtain data associated with the user (e.g., the sender) from a customer profile stored in a local storage device and/or database 105. Server 101 (and/or user device 102) may also populate one or more fields of one or more electronic documents based on the data associated with the user.

Alternatively or additionally, server 101 (and/or user device 102) may populate one or more fields of an electronic document to be completed based on the information extracted from a sample or template document. For example, server 101 (and/or user device 102) may obtain a stored sample or template electronic document (e.g., one or more template documents illustrated in FIG. 4C). Server 101 (and/or user device 102) may also extract information from the sample electronic document and populate one or more relevant fields of the electronic document to be completed using the extracted information.

In some embodiments, server 101 (and/or user device 102) may determine that an electronic document is not complete and may need additional information from the user (and/or a third-party). For example, server 101 (and/or user device 102) may present the user interface by highlighting the field(s) of the electronic document needing the user's attention. Other ways of providing this indication are also contemplated.

Figures 5A, 5B:
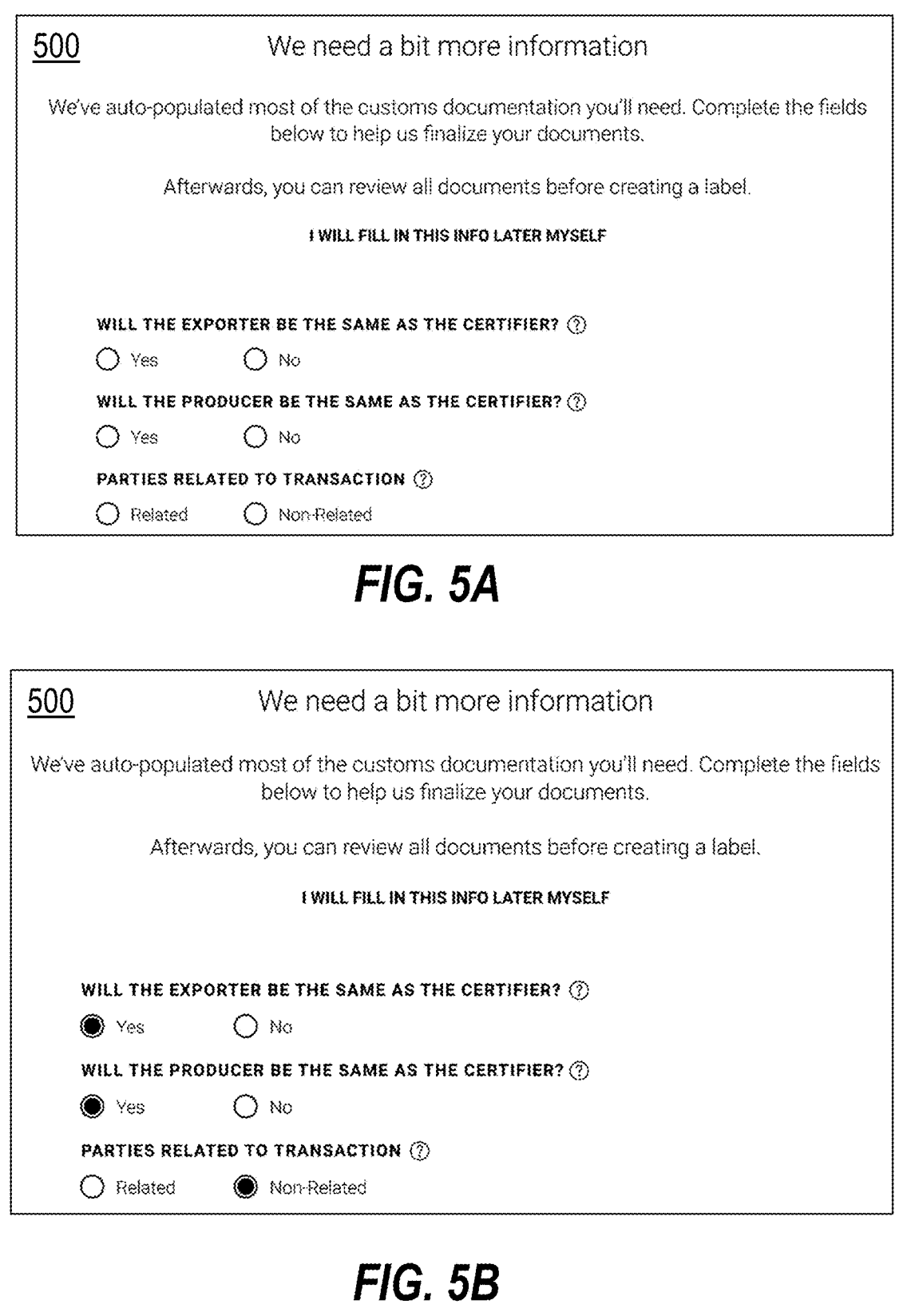

Alternatively or additionally, server 101 (and/or user device 102) may present one or more inquiries related to the requested information in the user interface, and the user may enter information in response to the one or more inquiries via the user interface. Server 101 (and/or user device 102) may receive the information and populate one or more fields of the electronic document based on the received information. By way of example, FIG. 5A is a schematic representation of an exemplary graphical user interface 500. As illustrated in FIG. 5A, graphical user interface 500 may present a series of questions and multiple answers relating to one or more fields to be completed in an electronic document. The user may select one of the answers presented for each of the questions, as illustrated in FIG. 5B. Alternatively, instead of providing the answers to the questions, the user may fill in the field(s) of the electronic document. For example, the user may click the option “I WILL FILL IN THIS INFO LATER MYSELF” in graphical user interface 500, and server 101 (and/or user device 102) may present the field(s) to be completed to the user via the user interface.

In some embodiments, server 101 (and/or user device 102) may provide an in-browser or in-application support in the user interface for providing the information needed to complete an electronic document. For example, the user may not know information relating to a field of a certificate of conformity. The user interface may provide a link for the user to contact an agent (e.g., a human agent, or a robot agent, or a combination thereof) to get help for obtaining the information. Alternatively or additionally, server 101 may provide the information requested by the user by searching a document database for one or more documents having the information. For example, server 101 may access a document database (e.g., database 105) to locate similar electronic documents that have been completed for this user (and/or other users). Server 101 may also extract the requested information from the document(s). Alternatively or additionally, server 101 may access a database having aggregated data from a plurality of shipping electronic documents to obtain the information. In some embodiments, server 101 may insert the obtained information into the relevant field(s) of the electronic document to be completed.

Figures 5C, 5D:
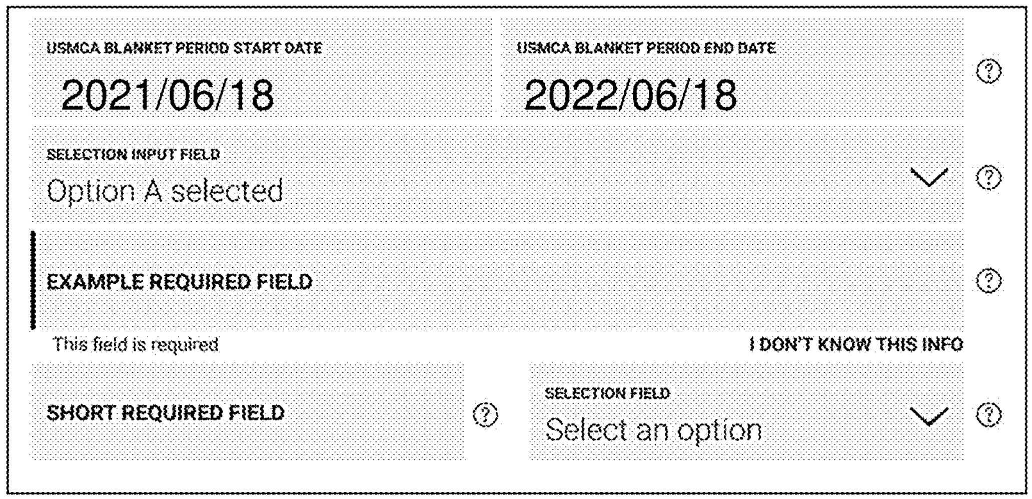

In some embodiments, server 101 (and/or user device 102) may present the populated one or more fields to the user. By way of example, FIG. 5C is a schematic representation of graphical user interface 500 showing the populated fields of a USMCA statement according to the response received from the user (and/or other information). In some embodiments, server 101 (and/or user device 102) may also highlight one or more fields that need the user's attention. For example, as illustrated in FIG. 5C, graphical user interface 500 may highlight the EXAMPLE REQUIRED FIELD to be completed. Graphical user interface 500 may also provide an option for the user to flag the field if the user does not know the information, as illustrated in FIG. 5D.

Figure 5E:
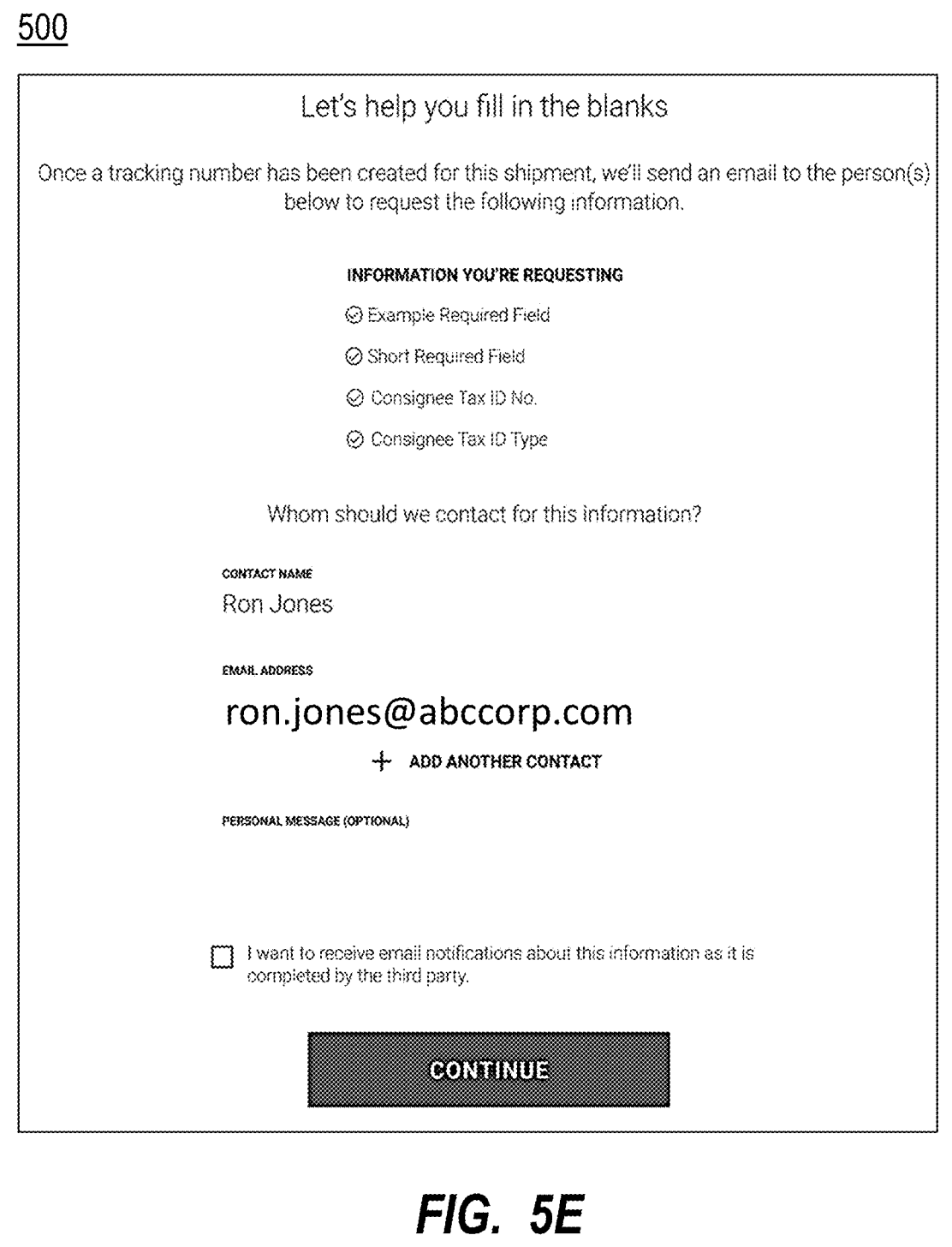

In some embodiments, server 101 (and/or user device 102) may provide an option to the user to coordinate with a third-party to fill in one or more fields of an electronic document. For example, server 101 (and/or user device 102) may determine one or more fields of an electronic document to be filled and present graphical user interface 500 illustrated in FIG. 5E for requesting relevant information from a third-party. By way of example, graphical user interface 500 may include information to be requested (e.g., "Example Required Field," "Short Required Field," "Consignee Tax ID No.," "Consignee Tax ID Type") from a third-party. In some embodiments, server 101 (and/or user device 102) may also automatically fill in the contact information of the party from which the information is to be requested (e.g., the contact's name, a telephone number, an email address, etc.) if such information is available. Alternatively or additionally, graphical user interface 500 may include one or more contact fields for the user to fill in and/or modify the contact information.

Server 101 (and/or user device 102) may also generate a request message (e.g., an email, a text message, etc.) requesting the information and transmit the request message to the third-party. The third-party may respond to the request message and provide the requested information via, for example, third-party device 103. For example, the third-party may transmit a reply message (e.g., an email or text message responding to the requested message) to server 101 (and/or user device 102), which may include the requested information, in response to the received request message via third-party device 103. Alternatively or additionally, the third-party may go to a webpage associated with server 101 based on a link included in the received message and provide the requested information via the webpage. Server 101 may receive the information and populate the relevant field(s) of the electronic document with the received information.

In some embodiments, server 101 may determine the status of the request based on any response (or the lack thereof) received from the third-party and inform the user and/or the third-party for any update relating to the request. For example, server 101 may receive a response from the third-party and populate the relevant field(s) of the electronic document. Server 101 may also transmit a message to the user and/or the third-party indicating that the relevant field(s) has/have been completed. In some embodiments, server 101 (and/or user device 102) may be configured to present the electronic document with the populated field(s) based on the received response from the third-party.

In some embodiments, server 101 may determine that the electronic document is completed and inform the user and/or the third-party of the status of the completed field(s) and/or the electronic document. For example, server 101 (and/or user device 102) may transmit a notification (and/or present the information via the user interface) to user device 102 and/or third-party device 103.

In some embodiments, one or more electronic documents may require a signature. For example, an electronic document may require a signature of the sender, a signature of the recipient, a signature of another party (e.g., the shipping vendor accepting the shipping order), or the like, or a combination thereof. Server 101 (and/or user device 102) may provide one or more options for obtaining a signature from the signing party. By way of example, FIG. 6 is a schematic representation of an exemplary graphical user interface 600 for receiving a signature from a party (e.g., the sender, the recipient, the vendor, etc.). In some embodiments, server 101 (and/or user device 102) may present graphical user interface 600 to the signing party for obtaining a signature. Alternatively or additionally, server 101 (or a computing device associated with the signature-requesting party) may transmit a message to a device associated with the signing party to request a signature. The signing party may access graphical user interface 600 by, for example, clicking a link embedded in the message, which may lead the signing party to access a webpage presenting graphical user interface 600. In some embodiments, for security purposes, the signing party may be required to provide credential information (e.g., username and password, PIN, etc.) before accessing graphical user interface 600 to provide his or her signature.

In some embodiments, server 101 (and/or user device 102) may provide various options for the signing party to provide a signature. By way of example, as illustrated in FIG. 6, graphical user interface 600 may provide three options from which the signing party may choose. The signing party may upload an image of a signature from a computing device associated with the signing party. Alternatively or additionally, the signing party may type the letters associated with his or her signature via an input device, which may be received by server 101 (and/or user device 102) and converted into a signature. For example, the signing party may type SIGNATURE via the input device, which may be received by server 101 (and/or user device 102). Server 101 (and/or user device 102) may convert the letters into a text string such as "/SIGNATURE/" as the signature. Alternatively or additionally, server 101 (and/or user device 102) may convert the letters into an image representing the signature. As another option, alternatively or additionally, the signing party may draw the signature via an input device, as illustrated in FIG. 6. Server 101 (and/or user device 102) may save and store the signature into a local storage device and/or database 105 in the form of text (or image or the like, or a combination thereof). In some embodiments, server 101 (and/or user device 102) may insert the obtained signature into one or more signature fields of an electronic document.

In some embodiments, server 101 (and/or user device 102) may transmit a notification to the signature-requesting party and/or the signing party indicating the status of the signing process (e.g., the signature is completed, signature is not readable, etc.).

In some embodiments, server 101 (and/or user device 102) may transmit one or more electronic documents related to the shipping order to a third-party before the package is shipped. For example, the user may create a shipping label for shipping and complete one or more electronic documents related to the shipping (as described elsewhere in this disclosure). Server 101 (and/or user device 102) may transmit one or more electronic documents to the recipient via third-party device 103. As another example, server 101 (and/or user device 102) may transmit one or more electronic documents (e.g., a customs clearance form) to a government agent (e.g., the customs agency of the destination country) such that the government agent may receive the document before the package arrives at the customs agency to expediate the clearance process.

Figure 7:
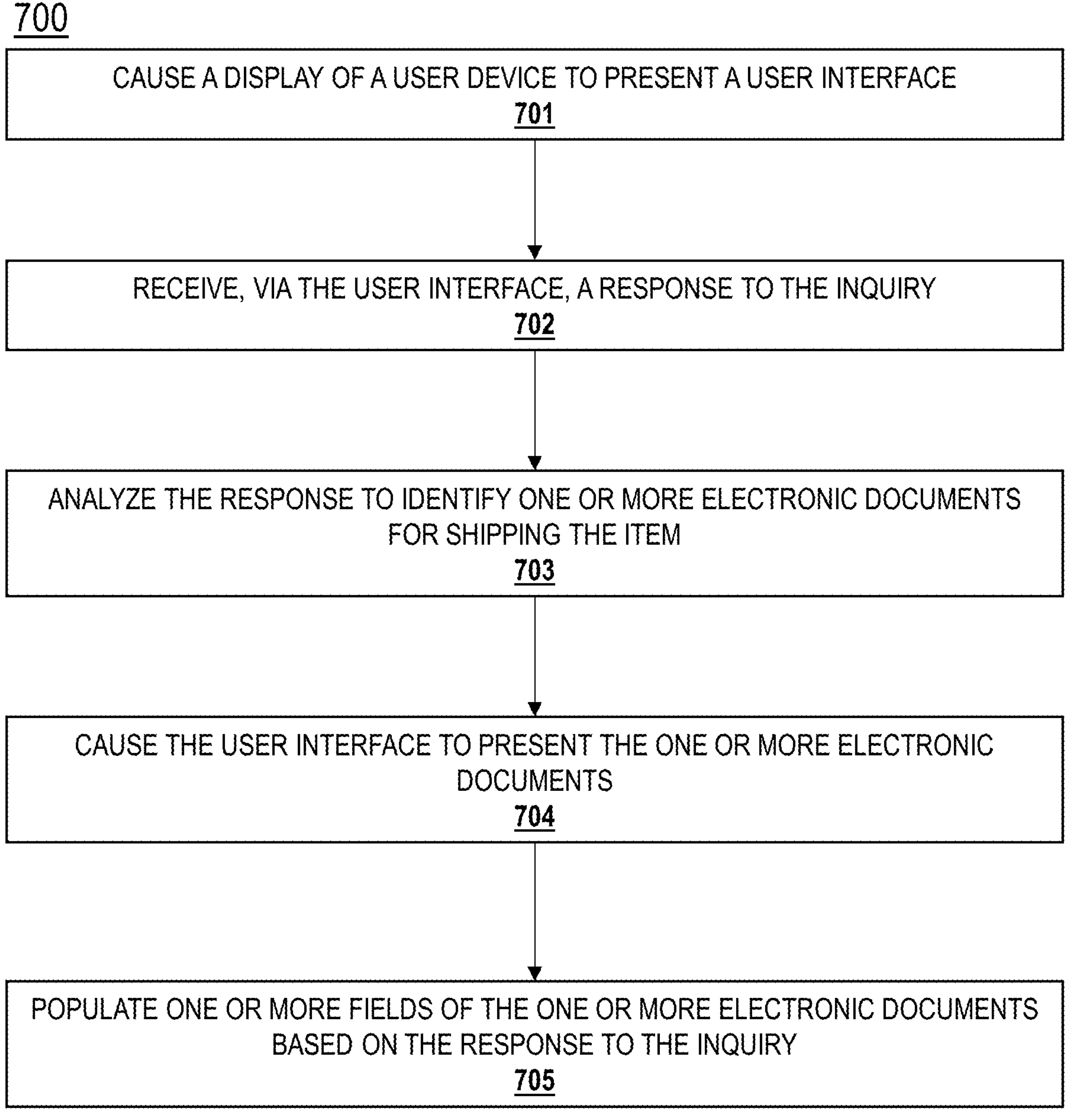
FIG. 7 is a flowchart of an exemplary process for generating an electronic document, consistent with embodiments of the present disclosure.

FIG. 7 is a flowchart of an exemplary process 700 for generating an electronic document, consistent with some embodiments of the present disclosure. While the description of process 700 are provided in connection with server 101, one having ordinary skill in art would understand that one or more steps of process 700 may be performed by another component of system 100 (e.g., user device 102, third-party device 103, etc.). For example, user device 102 may populate one or more fields of the one or more electronic documents based on a response to an inquiry received by user device 102. It is also contemplated that one or more of the steps of process 700 may be performed by any of server 101, user device 102, or third-party device 103, and one or more of the other steps may be performed by a different one of server 101, user device 102, or third-party device 103.

At step 701, server 101 may be configured to cause a display of a user device to present a user interface. The user interface may include an inquiry (e.g., request for information) related to an item to be shipped. For example, server 101 may provide a webpage accessible by user device 102 via network 104. The webpage may include a user interface that can be presented in a display associated with user device 102. Referring to FIG. 3, server 101 may be configured to present graphical user interface 300 to user device 102, which may include one or more questions related to an item to be shipped. By way of example, graphical user interface 300 may include three questions in area 310 related to a thermometer to be shipped (e.g., "What type of thermometer are you shipping?", "What is the primary material this thermometer is made from?", "What is the intended use of this thermometer?").

In some embodiments, the inquiry presented in the user interface may include one or more of: a question related to the item (e.g., a product size, a product weight, a product material, a product grade, etc.), a question related to the sender (e.g., the identity of the sender, the shipping address, the shipping zip code, the contact information, etc.), a question related to the recipient (e.g., the destination address, the destination country, the identity of the recipient, the contact information, etc.), and a question related to the shipping payment (e.g., the identity of the paying party (e.g., the sender or the recipient being responsible for the shipping payment), the payment method, etc.).

At step 702, server 101 may be configured to receive, via the user interface, a response to the inquiry. For example, the user may enter information in response to the questions via an input device (e.g., input device 205) associated with user device 102 via graphical user interface 300 illustrated in FIG. 3. The information may be received by server 101 (and/or user device 102). By way of example, as illustrated in FIG. 3, server 101 (and/or user device 102) may be configured to receive the response (e.g., "Digital," "Other," "Clinical/Medical") from the user via graphical user interface 300.

At step 703, server 101 may be configured to analyze the response to identify one or more electronic documents for shipping the item. For example, server 101 may employ a rule-based model for identifying one or more electronic documents based on the received response. Alternatively or additionally, server 101 may identify one or more electronic documents based on the received response using a machine-learning algorithm or a neural network for identifying electronic documents for shipping an item similar to the item to be shipped in this order.

In some embodiments, server 101 may also be configured to obtain one or more identified electronic documents (e.g., a blank electronic document) from a local storage device (e.g., storage device 203) and/or database 105 via network 104. Alternatively or additionally, server 101 (and/or user device 102) may request one or more identified electronic documents from the user and/or a third-party. By way of example, referring to FIG. 4A (which is a schematic representation of an exemplary graphical user interface 410), server 101 may present graphical user interface 410 listing three electronic documents to be provided in connection with the shipping of the item, including, for example, a commercial invoice, a United States-Mexico-Canada Agreement (USMCA) statement, and a destination control statement.

At step 704, server 101 may be configured to cause the user interface to present the one or more electronic documents (or a portion of an electronic document). For example, server 101 may cause the user interface to present an electronic document that is obtained from a document database. In some embodiments, server 101 (and/or user device 102) may present various options for the user to provide one or more identified documents. For example, server 101 (and/or user device 102) may present a few options in graphical user interface 410 for the user to provide a certificate of conformity, as illustrated in FIG. 4B. By way of example, graphical user interface 410 may present a first option to fill in the information needed to complete the certificate of conformity by starting from shipping details, a second option of using a document stored in a document library (which may be stored in a local storage associated with user device 102 and/or server 101, or a remote database such as database 105), a third option for requesting the document from a third-party (e.g., the recipient of the package), and a fourth option of uploading the document.

The user may select one of the options for complete the document via graphical user interface 410. For example, the user may select the second option of using a document stored in a document library via graphical user interface 420, which may lead server 101 (and/or user device 102) to present a user interface including one or more documents stored in a document library. For example, server 101 (and/or user device 102) may present an exemplary graphical user interface 420 illustrated in FIG. 4C for the user to browse and/or operate one or more electronic documents. As illustrated in FIG. 4C, graphical user interface 420 may include information related to one or more electronic documents, such as the document name, the document type, the country involved in the document, the source of the document, the date of the document, etc. The user may click one of the documents via graphical user interface 420 to view additional information of the document. By way of example, the user may select one of the documents, namely, 2018_Certificate_Conformity via graphical user interface 420. As illustrated in FIG. 4D, server 101 (and/or user device 102) may also be configured to present an overlaid window 430 showing at least a portion of the selected document. The user may also select the document via graphical user interface 420 (as illustrated in FIG. 4E) as the certificate of conformity for the present shipping order. Server 101 (and/or user device 102) may further be configured to check the certificate of conformity and present an indication in graphical user interface 420 that the document is completed, as illustrated in FIG. 4F. In some embodiments, graphical user interface 420 may enable the user to modify, update, and/or replace one or more documents.

At step 705, server 101 may be configured to populate one or more fields of the one or more electronic documents based on the response to the at least one question. For example, as described elsewhere in this disclosure, referring to FIG. 3, graphical user interface 300 may present one or more questions related to the item to be shipped. Server 101 may receive the response to the one or more questions via graphical user interface 300 (e.g., "Digital," "Other," "Clinical/Medical" illustrated in FIG. 3). Server 101 may also obtain an electronic document (e.g., a document template of a certificate of conformity) and populate one or more fields of the electronic document related to the type of the thermometer, the primary material of the thermometer, and/or the intended use of the thermometer (e.g., filling "digital," "other," "clinical/medical" into the relevant fields of the electronic document). Alternatively or additionally, server 101 may obtain other information related to the send, the recipient, and/or the item and populate one or more fields of an electronic document based on the obtained information. For example, server 101 may obtain data associated with the user (e.g., the sender) from a customer profile stored in a local storage device and/or database 105. Server 101 may also populate one or more fields of one or more electronic documents based on the data associated with the user. Alternatively or additionally, server 101 may populate one or more fields of an electronic document to be completed based on the information extracted from a sample or template document. For example, server 101 may obtain a stored sample or template electronic document (e.g., one or more template documents illustrated in FIG. 4C). Server 101 may also extract information from the sample electronic document and populate one or more relevant fields of the electronic document to be completed using the extract information.

In some embodiments, server 101 may present one or populated one or more fields to the user. By way of example, referring to FIG. 5C, server 101 may present graphical user interface 500 showing the populated fields of a USMCA statement according to the response received from the user (and/or other information). In some embodiments, server 101 may also highlight one or more fields that need the user's attention. For example, as illustrated in FIG. 5C, graphical user interface 500 may highlight the EXAMPLE REQUIRED FIELD to be completed. Graphical user interface 500 may also provide an option for the user to flag the field if the user does not know the information, as illustrated in FIG. 5D.

In some embodiments, server 101 (and/or user device 102) may provide an option to the user to coordinate with a third-party to fill in one or more fields of an electronic document. For example, server 101 (and/or user device 102) may determine one or more fields of an electronic document to be filled and present graphical user interface 500 illustrated in FIG. 5E for requesting relevant information from a third-party. By way of example, graphical user interface 500 may include information to be requested (e.g., "Example Required Field," "Short Required Field," "Consignee Tax ID No.," "Consignee Tax ID Type") from a third-party. In some embodiments, server 101 (and/or user device 102) may also automatically fill in the contact information of the party from which the information is to be requested (e.g., the contact's name, a telephone number, an email address, etc.) if such information is available. Alternatively or additionally, Graphical user interface 500 may include one or more contact fields for the user to fill in and/or modify the contact information. Server 101 (and/or user device 102) may also generate a request message (e.g., an email, a text message, etc.) requesting the information and transmit the request message to the third-party. The third-party may respond to the request message and provide the requested information via, for example, third-party device 103. For example, the third-party may transmit a reply message to server 101 (and/or user device 102), which may include the requested information, in response to the received request message via third-party device 103. Alternatively or additionally, the third-party may go to a webpage associated with server 101 based on a link included in the received message and provide the requested information via the webpage. Server 101 may receive the information and populate the relevant field(s) of the electronic document with the received information. In some embodiments, server 101 may determine the status of the request based on any response (or the lack thereof) received from the third-party and inform the user and/or the third-party for any update related to the request. For example, server 101 may receive a response from the third-party and populate the relevant field(s) of the electronic document. Server 101 may also transmit a message to the user and/or the third-party indicating that the relevant field(s) has/have been completed. In some embodiments, server 101 may also determine that the electronic document is completed and inform the user and/or the third-party of the status of the completed field(s) and/or the electronic document. For example, server 101 (and/or user device 102) may transmit a notification (and/or presenting the information via the user interface) to user device 102 and/or third-party device 103.

In some embodiments, server 101 may determine whether all the required documents are completed. If so, server 101 may transmit a notification to the user and/or one or more third parties. Optionally, the user may also print the shipping label and one or more documents (if needed) via user device 102.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs and logic based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for generating one or more electronic shipping documents, the system comprising:

a memory comprising instructions; and at least one processor configured to execute the instructions to perform operations comprising:

causing a display of a user device to present a user interface, the user interface comprising an inquiry related to an item to be shipped;

receiving, via the user interface, a response to the inquiry;

identifying, based on the response, a set of required electronic documents using:

a rule-based model comprising conditional expressions; and a trained machine-learning model trained using positive examples from historical shipping orders free of documentation issues and negative examples from historical shipping orders having at least one documentation issue;

causing the user interface to present the one or more electronic documents;

causing the user interface to present a required documents view that, for each required electronic document, concurrently displays:

a control enumerating one or more options including obtaining the required electronic document from a document library; and a completion state with edit and replace controls;

in response to a selection of the document library option:

presenting a view listing stored documents with data comprising at least one of: document name, document type, country, source, or commodity; and providing a preview overlay of a selected document;

extracting information from one or more saved electronic documents and saving the extracted information in an aggregated data structure separate from the one or more electronic documents and stored in association with a user profile;

automatically populating one or more fields of the one or more electronic documents based on the response to the inquiry and based on the extracted information saved in the data structure different from the one or more electronic documents;

upon determining that additional information is required:

highlighting in the user interface one or more required fields and providing a control to flag unknown fields;

generating an electronic message requesting values for the flagged fields from a third party, the electronic message including a second selectable link to a second webpage for inputting the values;

receiving, via the second webpage, a response comprising the requested values; and automatically populating the flagged unknown fields based on the response;

obtaining a signature by receiving at least one of: an uploaded image, typed characters converted into a canonical signature representation, or a drawn signature, storing the signature, and inserting the signature into one or more signature fields of the one or more electronic documents;

transmitting completed electronic documents to a government agent associated with a destination country;

providing a third selectable link, via the user interface, for enabling a user, upon selection of the third selectable link, to contact an agent associated with the system; and based on a determination that required fields of the one or more electronic documents are complete, causing the user interface to display an indication that the one or more electronic documents are complete.

2. The computer-implemented system according to claim 1, wherein the inquiry comprises a question related to at least one of: a product type, a product size, a product weight, a product material, or a product grade.

3. The computer-implemented system according to claim 1, wherein the third-party is a recipient of the item to be shipped.

4. The computer-implemented system according to claim 1, wherein the operations further comprise:

determining, based on the received response from the third-party, a status of the one or more electronic documents; and transmitting, via the network, the status to the third-party.

5. The computer-implemented system according to claim 1, wherein:

the inquiry comprises a first inquiry;

the received response to the inquiry comprises a first response to the first inquiry;

the one or more electronic documents comprise one or more first electronic documents; and the operations further comprise:

determining, based on the first response, a second inquiry;

causing the user interface to present the second inquiry;

receiving, via the user interface, a second response to the second inquiry;

determining, based on the second response, one or more second electronic documents to be filled for shipping the item; and populating one or more fields of the one or more second electronic documents.

6. The computer-implemented system according to claim 1, wherein the operations further comprise:

storing the one or more electronic documents into a database.

7. The computer-implemented system according to claim 1, wherein:

the one or more fields comprise one or more first fields;

the operations further comprise:

obtaining data associated with a user profile by accessing an aggregated data structure stored in association with the user profile, the aggregated data structure comprising data extracted from one or more saved electronic documents; and populating one or more second fields of the one or more electronic documents based on the data associated with the user profile.

8. The computer-implemented system according to claim 1, wherein:

the one or more fields comprise one or more first fields; and the operations further comprise:

obtaining a stored sample electronic document; and populating, based on the stored sample electronic document, one or more second fields of the one or more electronic documents.

9. A computer-implemented method for generating one or more electronic shipping documents, comprising:

causing a display of a user device to present a user interface, the user interface comprising an inquiry related to an item to be shipped;

receiving, via the user interface, a response to the inquiry;

identifying, based on the response, a set of required electronic documents using:

a rule-based model comprising conditional expressions; and a trained machine-learning model trained using positive examples from historical shipping orders free of documentation issues and negative examples from historical shipping orders having at least one documentation issue;

causing the user interface to present the one or more electronic documents;

causing the user interface to present a required documents view that, for each required electronic document, concurrently displays:

a control enumerating one or more options including obtaining the required electronic document from a document library; and a completion state with edit and replace controls;

in response to a selection of the document library option:

presenting a view listing stored documents with data comprising at least one of: document name, document type, country, source, or commodity; and providing a preview overlay of a selected document;

extracting information from one or more saved electronic documents and saving the extracted information in an aggregated data structure separate from the one or more electronic documents and stored in association with a user profile;

automatically populating one or more fields of the one or more electronic documents based on the response to the inquiry and based on the extracted information saved in the data structure different from the one or more electronic documents;

upon determining that additional information is required:

highlighting in the user interface one or more required fields and providing a control to flag unknown fields;

generating an electronic message requesting values for the flagged fields from a third party, the electronic message including a second selectable link to a second webpage for inputting the values;

receiving, via the second webpage, a response comprising the requested values; and automatically populating the flagged unknown fields based on the response;

obtaining a signature by receiving at least one of: an uploaded image, typed characters converted into a canonical signature representation, or a drawn signature, storing the signature, and inserting the signature into one or more signature fields of the one or more electronic documents;

transmitting completed electronic documents to a government agent associated with a destination country;

providing a third selectable link, via the user interface, for enabling a user, upon selection of the third selectable link, to contact an agent associated with the system; and based on a determination that required fields of the one or more electronic documents are complete, causing the user interface to display an indication that the one or more electronic documents are complete.

10. The method according to claim 9, wherein the inquiry comprises a question relating to at least one of: a product type, a product size, a product weight, a product material, or a product grade.

11. The method according to claim 9, further comprising:

determining, based on the received response from the third-party, a status of the one or more electronic documents; and transmitting, via the network, the status to the third-party.

12. The method according to claim 9, wherein:

the inquiry comprises a first inquiry;

the received response to the inquiry comprises a first response to the first inquiry;

the one or more electronic documents comprise one or more first electronic documents; and the method further comprises:

determining, based on the first response, a second inquiry;

causing the user interface to present the second inquiry;

receiving, via the user interface, a second response to the second inquiry;

determining, based on the second response, one or more second electronic documents to be filled for shipping the item; and populating one or more fields of the one or more second electronic documents.

13. The method according to claim 9, the method further comprising:

storing the one or more electronic documents into a database.

14. The method according to claim 9, wherein:

the one or more fields comprise one or more first fields; and the method further comprises:

obtaining data associated with a user profile by accessing an aggregated data structure stored in association with the user profile, the aggregated data structure comprising data extracted from one or more saved electronic documents; and populating one or more second fields of the one or more electronic documents based on the data associated with the user profile.

15. The method according to claim 9, wherein:

the one or more fields comprise one or more first fields;

the method further comprises:

obtaining a stored sample electronic document; and populating, based on the stored sample electronic document, one or more second fields of the one or more electronic documents.

16. A computer-implemented system for generating one or more electronic shipping documents, the system comprising:

a memory comprising instructions; and at least one processor configured to execute the instructions to perform operations comprising:

causing a display of a user device to present a user interface, the user interface comprising an inquiry related to an item to be shipped;

receiving, via the user interface, a response to the inquiry;

identifying, based on the response, a set of required electronic documents using:

a rule-based model comprising conditional expressions; and a trained machine-learning model trained using positive examples from historical shipping orders free of documentation issues and negative examples from historical shipping orders having at least one documentation issue;

causing the user interface to present the one or more electronic documents;

causing the user interface to present a required documents view that, for each required electronic document, concurrently displays:

a control enumerating one or more options including obtaining the required electronic document from a document library; and a completion state with edit and replace controls;

in response to a selection of the document library option:

presenting a view listing stored documents with data comprising at least one of: document name, document type, country, source, or commodity; and providing a preview overlay of a selected document;

extracting information from one or more saved electronic documents and saving the extracted information in an aggregated data structure separate from the one or more electronic documents and stored in association with a user profile;

automatically populating one or more fields of the one or more electronic documents based on the response to the inquiry and based on the extracted information saved in the data structure different from the one or more electronic documents;

upon determining that additional information is required:

highlighting in the user interface one or more required fields and providing a control to flag unknown fields;

generating an electronic message requesting values for the flagged fields from a third party, the electronic message including a second selectable link to a second webpage for inputting the values;

receiving, via the second webpage, a response comprising the requested values; and automatically populating the flagged unknown fields based on the response;

obtaining a signature by receiving at least one of: an uploaded image, typed characters converted into a canonical signature representation, or a drawn signature, storing the signature, and inserting the signature into one or more signature fields of the one or more electronic documents;

transmitting completed electronic documents to a government agent associated with a destination country;

providing a third selectable link, via the user interface, for enabling a user, upon selection of the third selectable link, to contact an agent associated with the system; and based on a determination that required fields of the one or more electronic documents are complete, causing the user interface to display an indication that the one or more electronic documents are complete.

* * * * *